(12) United States Patent
De Belder et al.

(10) Patent No.: US 7,788,740 B2
(45) Date of Patent: Sep. 7, 2010

(54) LAVATORY BOWL RIM-BLOCK

(75) Inventors: Gian De Belder, Aartselaar (BE); Veronique Sylvie Metrot, Brussels (BE); Maria Papadaki, Meise (BE); Neil John Rogers, Vilvoorde (BE); Karl Patrick Ronn, Cincinnati, OH (US); Vincenzo Tomarchio, Brussels (BE); Michael Jakob Reynen, Grimbergen (BE)

(73) Assignee: The Procter & Gamble Company, Cincinnati, OH (US)

( * ) Notice: Subject to any disclaimer, the term of this patent is extended or adjusted under 35 U.S.C. 154(b) by 1061 days.

(21) Appl. No.: 10/824,126

(22) Filed: Apr. 14, 2004

(65) Prior Publication Data

US 2005/0202988 A1  Sep. 15, 2005

(30) Foreign Application Priority Data

Apr. 15, 2003 (EP) .................................. 03076096
Oct. 28, 2003 (EP) .................................. 03078382

(51) Int. Cl.
*E03D 9/02* (2006.01)
(52) U.S. Cl. ................................ 4/213; 4/223; 510/191
(58) Field of Classification Search ..................... 4/213, 4/223; 510/191
See application file for complete search history.

(56) References Cited

U.S. PATENT DOCUMENTS

| 3,359,063 | A |   | 12/1967 | Maude |       |
|-----------|---|---|---------|-------|-------|
| 4,666,671 | A | * | 5/1987  | Purzycki et al. | 422/5 |
| 4,709,425 | A |   | 12/1987 | Bavaveas |   |
| 5,210,884 | A | * | 5/1993  | Redford | 4/348 |
| 6,178,564 | B1| * | 1/2001  | Leonard et al. | 4/223 |
| 6,662,380 | B1| * | 12/2003 | Leonard et al. | 4/231 |
| 2002/0148036 | A1 |   | 10/2002 | Wilson et al. |   |

FOREIGN PATENT DOCUMENTS

| EP | 0 538 957 A1 | 4/1993 |
| EP | 1 046 756 A1 | 10/2000 |
| EP | 1 072 728 A2 | 1/2001 |
| GB | 918218 | 2/1963 |
| GB | 2 338 496 A | 12/1999 |
| WO | WO 00/42261 | 7/2000 |
| WO | WO 01/02653 A1 | 1/2001 |
| WO | WO 01/06067 A2 | 1/2001 |
| WO | WO 01/88286 A1 | 11/2001 |

* cited by examiner

*Primary Examiner*—Gregory E Webb
(74) *Attorney, Agent, or Firm*—David V. Upite; Brent M. Peebles; Leonard W. Lewis

(57) ABSTRACT

The present invention encompasses a lavatory bowl rim-block comprising: a) a container holding a liquid, perfume-containing composition; b) a dispensing means for dispensing said composition from under the rim of a lavatory bowl; and c) a fragrance delivery component.

21 Claims, No Drawings

LAVATORY BOWL RIM-BLOCK

CROSS REFERENCE TO RELATED APPLICATIONS

This application claims the benefit of the filing date of EPO patent application 03076096.1 filed Apr. 15, 2003.

TECHNICAL FIELD

The present invention relates to a lavatory bowl rim-block comprising: a) at least one container; b) a dispensing means; and c) a fragrance delivery component. The lavatory bowl rim-block herein provides excellent fragrance delivery performance.

BACKGROUND

A great variety of ways to clean lavatory bowls, such as toilet bowls, has been described in the art. One particular way of cleaning lavatory bowls, such as toilet bowls, are so called rim-blocks. Indeed, rim-blocks are devices that dispense liquid or dissolved solid compositions into a lavatory bowl from under the rim of said bowl. Such rim-blocks are usually attached by various means, such as hooks and the like, to the rim of the lavatory bowl. Rim-blocks dispensing at least one liquid composition into the lavatory bowl, so called "liquid rim-blocks", are preferred over rim-blocks dispensing a dissolved solid composition. This is due to the fact that firstly, solid rim-blocks tend to exhibit a far greater variation in the amount of product dispensed into the flush during their lifetime. It has been observed that towards the end of the solid rim-block lifetime, the solid composition therein tends to dramatically reduce in size and also in surface area open to the flush water thereby limiting the amount of dispensed/dissolved product. Secondly, the solid rim-block can become highly unsightly during use. Thirdly, the air freshening capability of solid rim-blocks tends to be inferior as compared to liquid rim-blocks as the release of perfume from a solid composition tends to be lower than from a liquid composition.

In addition to the cleaning benefit provided by liquid rim-blocks, it is desirable that liquid rim-blocks provide fragrance (i.e., perfume and/or deodorant) delivery into the bathroom/toilet room atmosphere. Therefore, liquid rim-blocks dispensing a liquid, perfumed composition, providing at least some perfume delivery were developed and are disclosed in the art. Indeed, for example, EP-A-0 538 957 describes a bottle holding a liquid composition upturned within a cage that is hung using a hook inside the toilet rim. In use, the liquid composition flows continuously from the bottle into a "porous mass" that both distributes the product into the flush water as well as exposing a large surface area of the product to the environment for air freshening.

However, a known drawback of the liquid rim-blocks described in the art, is their still insufficient performance with regard to fragrance delivery into the bathroom atmosphere. Indeed, it has been found by consumer research that consumers are looking for liquid rim-blocks that provide a combination of ongoing fragrance delivery into the bathroom atmosphere with a perfume boost into the bathroom atmosphere upon flushing of the lavatory bowl.

Liquid rim-blocks that continuously release a liquid composition from a container into a cage are for example described in EP-A-0 538 957, U.S. Pat. No. 6,178,564 and WO 00/42261. Such continuous release rim-blocks may create some degree of ongoing perfume delivery into the bathroom atmosphere since this liquid composition can release a perfume, if present in the composition, into the air. Furthermore, other forms of continuous perfume release are for example described in U.S. Pat. Nos. 4,709,425, 3,359,063 or GB 918,218. However, such continuous release rim-blocks or other continuous perfume release devices fail to provide a perfume boost into the bathroom atmosphere upon flushing of the lavatory bowl. In addition, the continuous release rim-blocks often exhibit liquid leakage into the lavatory bowl, especially if the lavatory bowl is not used on a regular basis. This results in product unsightly coating the lavatory bowl surface. In addition, this continuous leakage can result in the premature emptying of the liquid bottle.

Furthermore, liquid rim-blocks that dispense a liquid composition from a container only during the flush are for example described in WO 01/06067, EP 10072728 and WO 01/02653. Such rim-blocks that dispense a liquid composition only during the flush may provide a perfume boost into the bathroom atmosphere upon flushing of the lavatory bowl, provided a perfume is present in the liquid composition dispensed during the flush. However, the perfume boost into the bathroom atmosphere upon flushing of the lavatory bowl is limited, as there is insufficient time to allow the product to evaporate thereby creating the perfume boost. Furthermore, such rim-blocks that dispense a liquid composition only during the flush fail to provide an ongoing perfume delivery into the bathroom atmosphere.

In addition, liquid rim-blocks that dispense a liquid composition after the flush are for example described in WO 01/88286 and EP-A-1 046 756. Such liquid rim-blocks that dispense a liquid composition after the flush do eventually provide a perfume boost into the bathroom atmosphere upon flushing of the lavatory bowl, provided a perfume is present in the liquid composition dispensed during the flush. Indeed, the liquid composition can release perfume before the next flush. However, it has been found that the amount of liquid composition and therefore perfume that is released by such rim-blocks is small and quickly evaporates providing air freshening only for a very limited time period, such as 1 to 2 hours, after the flush. Therefore, this fails to provide an ongoing perfume delivery into the bathroom atmosphere.

In view of the above, it is therefore an objective of the present invention to provide a liquid rim-block that provides a combination of ongoing fragrance (i.e., perfume and/or deodorant) delivery into the bathroom atmosphere with a perfume boost into the bathroom atmosphere upon flushing of the lavatory bowl.

It has now been found that the above objective can be met by a lavatory bowl rim-block according to the present invention.

SUMMARY OF THE INVENTION

The present invention encompasses a lavatory bowl rim-block comprising:

a) at least one container holding a liquid, perfume-containing composition;

b) a dispensing means for dispensing said composition from under the rim of a lavatory bowl into the flush water of said lavatory bowl; and c) a fragrance delivery component;

wherein said fragrance delivery component does not dispense a fragrance using said dispensing means and delivers said fragrance into the ambiance over a prolonged period of time.

DETAILED DESCRIPTION OF THE INVENTION

Lavatory Bowl Surfaces

The lavatory bowl rim-block according to the present invention is used in a lavatory bowl, such as a toilet bowl, urinals and the like. Preferably, the lavatory bowl rim-block according to the present invention is placed at the inside portion of a lavatory bowl, such as a toilet bowl, urinals and the like. In a highly preferred embodiment herein, the lavatory bowl rim-block herein is a toilet rim-block preferably for use in a toilet bowl.

The lavatory bowl surfaces herein may be made of different materials like ceramic, enamel, vinyl, no-wax vinyl, linoleum, melamine, glass, Inox®, Formica®, any plastics, plastified wood, metal or any painted or varnished or sealed surface and the like.

Lavatory Bowl Rim-Block

The lavatory rim-block herein comprises: a) at least one container holding a liquid, perfume-containing composition; b) a dispensing means for transporting the liquid composition from the container and dispensing said composition from under the rim of a lavatory bowl into the flush water of said lavatory bowl; and c) a fragrance delivery component.

Preferably, the lavatory rim-block herein dispenses at least one liquid composition from the rim portion of a lavatory bowl onto a lavatory bowl surface. Indeed, the lavatory rim-block herein is preferably designed such that a sufficient amount of the liquid composition herein is transferred to the lavatory bowl upon flushing of the lavatory bowl with water.

The lavatory rim-block herein comprises as a first essential element at least one container holding a liquid, perfume-containing composition. The container herein may by any suitable container to hold a liquid composition. Indeed, suitable containers herein include, but are not limited to bottles, jars, pouches, boxes, sachets and the like. Preferably, said container has at least one opening. The container is preferably made by blow molding of thermoplastic material, more preferably a material selected from group consisting of Polyethylene Terephthalate (PET), Polyethylene Terephthalate-G (PETG), Polyvinyl Chloride (PVC), Polypropylene (PP), Polystyrene (PS), High Impact Polystyrene (HIPS), Polyvinylidene Chloride (PVDC), and mixtures thereof. Furthermore, said container is preferably transparent, which allows its user to visualize when said container is empty. The opening, if any, of said container may be sealed, preferably with a plastic cap. Such a seal will prevent leakage of composition out of the container prior to use of the container.

Preferably, the container herein is a bottle designed to be pushed into the rim-block. This pushing ruptures a seal, placed over an opening of the container and sealing the container during shipment, and releases a liquid composition present in the container into the dispensing means.

In a preferred embodiment herein, the container of the lavatory bowl rim-block is refillable and/or replaceable. Indeed, the container as a whole may be replaced once it is empty (replaceable) or the liquid, perfume-containing composition may be refilled into the existing container. The container may be refilled through an aperture in the container with the liquid, perfume-containing composition provided in a separate container, such as a bottle.

The lavatory rim-block of the present invention comprises as a second essential element a dispensing means for dispensing said composition from under the rim of a lavatory bowl into the flush water of a lavatory bowl. Preferably, said dispensing means is connected to said container.

The dispensing means herein may be any suitable means to dispense at least one liquid composition onto a lavatory bowl surface. The lavatory bowl rim-block herein may comprise one or a multitude of dispensing means. Suitable means to dispense at least one liquid composition onto a lavatory surface are: apertures; spray heads; trays; pads with or without capillary channels; plates with or without capillary channels; blotter type dispensing means; such as described in EP-A-0 775 741, U.S. Pat. No. 6,178,564, WO 00/42261, U.S. Pat. No. 6,412,120, EP-A-1 046 755, WO 02/36895 and the like.

In a preferred embodiment herein, upon the flushing of the lavatory bowl, the dispensing means of the lavatory rim-block herein, comes into contact with water used to flush said lavatory bowl. In this preferred embodiment, the water used to flush said lavatory bowl mixes with at least one liquid composition of the lavatory rim-block herein and thereby delivers the composition onto the lavatory bowl surface. The dispensing means herein is connected to said container by any suitable means, such as pipes, tubes, and the like, and may further contain valves, mixing chambers, shutters etc.

The lavatory rim-block herein may comprise other elements such as: an attachment means; a supporting structure, holding the different elements of the rim-block together; blinds, used for aesthetics or to regulate water flow; wings, used to regulated water flow; etc.

In a preferred embodiment herein, the lavatory rim-block, additionally comprises an attachment means. More preferably, the lavatory rim-block herein additionally comprises an attachment means and a supporting structure. Said attachment means is used to connect the lavatory rim-block to a lavatory bowl and hold it in place over its lifetime. Suitable attachment means are selected from the group consisting of: hooks, a suction cup or a set thereof, an adhesive, and mixtures thereof. Preferably said attachment means attaches the rim-block to the rim-portion of a lavatory bowl or suspends the rim-block from said rim. In a preferred embodiment said attachment means is a hook to suspend the rim-block from the rim-portion of a lavatory bowl.

In a preferred embodiment of the present invention, the lavatory rim-block comprises one single-compartment container holding the liquid, perfumed composition herein ("single compartment liquid rim-block").

In another preferred embodiment herein, the lavatory rim-block herein comprises more than one container and/or a multiple compartment container, wherein the perfume herein may be present only in one liquid composition contained in one of the containers or compartments thereof or the perfume may be present in more than one of the compositions contained in different containers or compartments. In a preferred embodiment of the present invention, the lavatory rim-block herein comprises two to four, more preferably two to three, and most preferably two containers. In another preferred embodiment of the present invention, the lavatory rim-block herein comprises at least one container comprising two to four, more preferably two to three, most preferably two compartments per container.

In an embodiment herein, wherein the lavatory rim-block herein comprises more than one composition, said compositions may be dispensed separately or as a combination of compositions. By "combination of compositions" it is meant that the various compositions are mixed or at least combined: prior to being dispensed, e.g., in a mixing chamber, if any, or the dispensing means; during the dispensing, e.g., on the dispensing means; or after being dispensed, on the lavatory surface itself (this means in the flush).

In an embodiment of the present invention, wherein said rim-block additionally comprises a solid and/or gel composition, it may be necessary for the flush water to dissolve or wash away said solid and/or gel composition. This can be achieved by, for example, providing a container containing said solid and/or gel composition(s) that is water permeable using openings, slits, and the like, or even water soluble.

Fragrance Delivery Component

The lavatory rim-block according to the present invention comprises as a third essential element a fragrance delivery component wherein said fragrance delivery component does not dispense a fragrance using said dispensing means and delivers said fragrance, preferably directly and on an ongoing basis, into the ambiance over a prolonged period of time. Preferably, the fragrance delivery component herein comprises a perfume and/or a deodorant, preferably a perfume. The fragrance delivery component is comparable in its performance to an air freshener device.

By "fragrance" it is meant herein any chemical compound or mixture thereof that can alter the detectable character (smell) of air. This includes perfumes that create a (pleasant) smell, wherein the smell masks malodor. It also includes compounds, which directly remove malodors from the air (i.e., deodorants), or combinations of both perfumes and deodorants.

By "ambiance" it is meant herein the atmosphere of the bathroom or toilet (i.e., the room) wherein the lavatory bowl comprising the lavatory rim-block is present.

By "delivery over a prolonged period of time" it is meant herein that the fragrance delivery component delivers a fragrance directly into the ambiance on an ongoing basis and for a period of time that exceeds at least 24 hours. Preferably, the fragrance delivery component herein delivers a fragrance into the ambiance from 48 hours to 100 days, more preferably from 7 days to 100 days, even more preferably from 14 hours to 80 days, still more preferably from 17 days to 60 days and most preferably from 21 days to 42 days.

By "said fragrance delivery component not dispensing a fragrance using said dispensing means" it is meant herein that the fragrance delivery component herein directly delivers the fragrance into the atmosphere of the bathroom or toilet independently of the delivery of the liquid composition through the dispensing means of the lavatory rim-block. However, said fragrance delivery component may optionally be attached to the dispensing means or may be placed in close vicinity of the dispensing means, provided the dispensing means and the delivery of the fragrance delivery component work independently of each other. Furthermore, the fragrance delivery component herein may be attached to or be part of any part of the rim-block (e.g. attached to the container or to the attachment means, if any).

Any fragrance delivery component suitable of delivering a fragrance into the ambiance over a prolonged period of time may be used in the lavatory rim-block herein. Suitable fragrance delivery components are selected from the group consisting of: fragranced gels; fragranced plastics; a wick delivery system comprising a fragrance-containing liquid; permeable film delivery systems combined with a fragranced gel or a fragrance-containing liquid; and battery/electrical fragrance release systems; and combinations thereof. The fragrance delivery component can be incorporated into the lavatory bowl rim-block of the present invention in a variety of different ways. Suitable non-limiting examples are shown herein below:

Fragranced Gel

In a preferred embodiment of the present invention, the fragrance delivery component herein may be a fragranced gel that preferably continuously releases a fragrance for a prolonged period of time. More preferably, the fragrance delivery component herein is a perfumed gel.

By "fragranced/perfumed gel" it is meant herein any wax- and/or gel-based substance that contains a fragrance/perfume and is capable of releasing the fragrance/perfume into the atmosphere of the bathroom or toilet.

Fragranced gels include any type of wax- and/or gel-based substances suitable to release a fragrance. More preferably, the fragranced gel herein is an anhydrous or an aqueous fragranced gel.

Preferably, the wax- and/or gel-based substances for use herein are selected from the group consisting of: anhydrous wax- and/or gel-based substances; and aqueous wax- and/or gel-based substances; and mixtures thereof.

Preferred anhydrous wax- and/or gel-based substances for use herein are selected from the group selected from the group consisting of: polyamide polymers; waxes; styrene polymers; stearates; ester-terminated dimmer acid-based polyamides; maleinized polybutadienes in combination with dihydroxypolybutadienes and an ethoxylated primary amine; maleinized polyisoprenes in combination with dihydroxypolybutadienes and an ethoxylated primary amine; and mixtures thereof.

Preferred aqueous wax- and/or gel-based substances for use herein are selected from the group selected from the group consisting of: water and a gelling agent such as carrageenan gum or gellan gum; water in combination with polyvinyl alcohol or polyvinyl acetate and dimethyl sulfoxide; water in combination with a polymer such as a polyacrylamide; water in combination with stearic acid, propylene glycol and activated carbon; and anhydrous sodium polyacrylate and mixtures thereof.

These wax- and/or gel-based substances for use herein are typically manufactured by processing them initially in their liquid form, often by heating. Indeed, the gels are typically heated to melt the gel, or the gel is polymerized or gellified in the liquid state at high temperature. A fragrance, preferably a perfume, is subsequently added to the heated gel, and the heated, fragranced liquid is then being cooled to form the gel structure.

In a preferred embodiment herein, the fragranced gel herein is an anhydrous fragranced gel, more preferably the fragranced gel herein is selected from the group consisting of: polyamide polymers additionally containing up to 90% by weight of the fragranced gel of fragrance; waxes additionally containing up to 90% by weight of the fragranced gel of fragrance; styrene polymers additionally containing up to 90% by weight of the fragranced gel of fragrance; stearates additionally containing up to 90% by weight of the fragranced gel of fragrance; ester-terminated dimmer acid-based polyamides additionally containing up to 50% by weight of the fragranced gel of fragrance; maleinized polybutadienes in combination with dihydroxypolybutadienes and an ethoxylated primary amine additionally containing up to 95% by weight of the fragranced gel of fragrance; and maleinized polyisoprenes in combination with dihydroxypolybutadienes and an ethoxylated primary amine additionally containing up to 95% by weight of the fragranced gel of fragrance; and mixtures thereof. Suitable fragranced gels are for example described WO 02/066084, WO 98/17243, U.S. Pat. No. 5,780,527, and WO 01/78794. Suitable perfumed gels are commercially available under the trade name of Crystal Air® by Reckitt Benckiser or under the names Sylvaclear®, Sylvacote® or Uniclear® resins, by Arizona Chemical. Similar performing gels to those listed above may also be used. Anhydrous sodium polyacrylate or similar gel compositions are detailed in US 2002/0041860 A1.

In the preferred embodiment herein, wherein the fragrance delivery component herein is a fragranced gel, the lavatory bowl rim-block, preferably initially, comprises up to 95%, preferably from 10% to 95%, more preferably from 50% to 95% by weight of fragrance, preferably perfume.

The shape of the gel may be any design suitable to deliver a fragrance into the ambiance. The fragranced gel may be placed directly into any appropriate position on the rim-block. This includes combining the fragranced gel with the container, and/or with the dispensing means and/or with an attachment means, if any. For combining the fragranced gel with the container, a recess can be created on the outer surface of the container to create a region that may be filled with fragranced gel. This recess can easily be created during the container blow molding process. The recess may be molded into the outer surface on the front panel, top panel, sides, bottom or back panel of the container. This recess is filled with liquid fragranced gel, which is solidified into the recess. Alternatively a recess could be created on the surface of the dispensing means or attachment means (if any), which is then filled with fragranced gel. For pieces, which are typically injection molded, a recess can easily be created within the surface of the piece during the molding process itself.

Alternatively, the fragranced gel may be cast as a separate strip and attached into the recesses on the surface of the lavatory bowl rim-block herein, preferably the container, dispensing means and/or attachment means (if any), via a variety of different means, such as adhesives. Alternatively, the gel may be attached directly to the surface of the lavatory bowl rim-block herein, preferably the container, dispensing means and/or attachment means (if any), without a recess using the same attachment means mentioned above or the lavatory bowl rim-block herein or parts thereof may be fully or partially coated with the fragranced gel by either dipping or spraying the fragranced gel on the surface of the lavatory bowl rim-block herein. Alternatively, the fragranced gel may be filled into a separate piece containing a complementary recess to that placed in the surface of the lavatory bowl rim-block, or the fragranced gel may be cast as a separate sheet or strip and attached to such a separate piece. This separate piece is then fastened onto the outer surface of the lavatory bowl rim-block herein or a part thereof, by clipping the piece into a recess in the outer surface of the lavatory bowl rim-block herein or by adhesives or various other means. This separate piece containing the fragranced gel may be sold separately or in combination with the liquid containers. The separate piece would therefore be refilled in the lavatory bowl rim-block either separately or at the same time as when the liquid container is also refilled.

In a highly preferred embodiment herein, said fragrance delivery component is a fragranced gel, preferably a perfumed gel, which is preferably present in a recess on the outside portion of the container, dispensing means or attachment means, if any, of the lavatory bowl rim-block herein.

In a preferred embodiment herein, the fragranced gel is an anhydrous fragranced gel. These gels do not release fragrance until they are activated by adding water to the gel system. Preferably the anhydrous fragranced gels herein are placed at a region of the rim-block that is routinely exposed to the flush water. This is because, on first usage or flush, water flows into the anhydrous fragranced gel and activates it such that it starts to give off perfume, and then freshens the atmosphere around the toilet for the lifetime of the device. This technology therefore has the advantage of only starting to operate once it is in use within the toilet.

In a preferred embodiment herein, the fragranced gel, preferably the anhydrous fragranced gel, herein is present in a recess of the surface of the lavatory bowl rim-block herein and covered with a perforated covering. Such a covering has the function to hold the gel in place prior to usage, allowing water into the recess to activate the anhydrous fragranced gel, if present, and keeping the activated gel in place during subsequent flushes. Indeed, the anhydrous nature of the gel may result in a gel that does not adhere well to the surface of the rim-block. Different means to cover with a perforated covering are to use a rigid plastic grid that may be clipped into the recess over the gel to hold it in place, or a perforated film that is heat sealed or glued over the recess. A preferred embodiment is to use a perforated film similar to the top sheet used on feminine protection products such as those sold under the trade name Always® commercially available from The Procter & Gamble Company. These sheets allow water to pass into the gel due to the shape of the perforated holes. However, water cannot escape again keeping the water in place to continue to activate the gel.

For all of the fragranced gel-based embodiments, the fragranced gel may optionally but highly preferred be protected from releasing its fragrance into the atmosphere prior to usage of the rim-block. This can be solved by packaging the liquid rim block in a package that has a high gas barrier. A preferred option would be a transparent thermoformed blister pack made from PET, PVC or other similar materials having a high oxygen barrier film over the top of the blister made from laminates of aluminum, metallised PET, metallised biaxially oriented polypropylene and/or other similar film materials. An alternative would be to seal a high gas barrier peel-able film onto the rim-block so that it covers the perfumed gel on the surface of the rim-block, or alternatively onto the separate piece so that it covers the gel container within the separate piece. This film would then be removed by the user prior to placing the rim-block into the lavatory bowl. Preferably, the peel-able film would be transparent to allow the consumer to also see the gel on shelf. A suitable film would be a laminated film using $Al_2O_3$, $SiO_2$ or PVDC coatings or other similar high gas barrier transparent films.

For all embodiments herein containing a fragranced gel, a highly preferred embodiment is to place the perfumed gel in a recess preferably on the outward-facing section of the container. By "outward-facing section" it is meant the section or side of the container that faces away from the (in relative terms closest) rim section of a lavatory bowl, preferably the section on the side oriented towards the center of the bowl.

Alternatively, for all embodiments herein containing a fragranced gel, a highly preferred embodiment is to place the fragranced gel in a recess preferably on the rim-facing section of the container. By "rim-facing section" it is meant the section or side of the container that faces towards the (in relative terms closest) rim section of a lavatory bowl, preferably the section on the side oriented away from the center of the bowl. This rim-facing configuration has the advantage that upon use of the lavatory bowl, the risk of contamination of the perfumed gel with urine or feces is reduced.

In the preferred embodiments, wherein the fragranced gel is present in a recess of the container herein, setting the fragranced gel into the recess may be achieved by pouring the heated fragranced gel directly into the recess and allowing it to cool. A small peel-able and preferably transparent film with a high barrier may be placed over the fragranced gel in the recess and sealed to the outer part of the recess in the container. This embodiment has the advantage that it protects the fragranced gel prior to use and creates a convenient user-friendly refill system. Indeed, the fragranced gel is replaced at the same time as when the bottle is replaced, and the peel-able film is removed to expose the gel during the standard refill process.

In addition, two or more layers of gel may be filled on top of each other. This has the advantage of the lower layer acting as an adhesive to the upper layers. This can more effectively stick the fragranced gel into the rim block device so that is does not drop out due to the flow of water or urine, or to prevent undue shrinkage of the gel as the fragrance evaporates. In addition, the level (%) of fragrance can be altered in these layers to better control the release of fragrance from the gel. Alternatively, two or more different gels can be cast into the rim block side by side. This has the advantage of creating better aesthetics for the consumer. In addition, different fragrance or ingredients can be added to each gel (e.g. perfume in one gel and de-odorant in the other gel).

Fragranced Plastics

In a preferred embodiment of the present invention, the fragrance delivery component herein may be a fragranced plastic that preferably continuously releases a fragrance for a prolonged period of time. More preferably, the fragrance delivery component herein is a perfumed plastic.

By "fragranced/perfumed plastic" it is meant herein any plastic material that contains a fragrance/perfume and is capable of releasing the fragrance/perfume into the atmosphere of the bathroom or toilet.

Fragranced plastics include any type of plastic material suitable to release a fragrance. Preferably, suitable plastic materials for use as a fragranced plastic are selected from the group consisting of: polyethylene terephthalate (PET); polyethylene (PE); polypropylene (PP); polyvinyl chloride (PVC); high impact polystyrene (HIPS); polystyrene (PS), thermoplastic elastomers (TPE), ethyl vinyl acetate (EVA) and the like.

The plastic material herein contains a fragranced, preferably perfumed, masterbatch. By "fragranced masterbatch" it is meant herein a portion of material consisting of a carrier resin such as PET, PE, PP, PVC, HIPS and/or PS and a high level of fragrance (preferably perfume) preferably up to 95%, from 10% to 90%, more preferably from 50% to 85% by weight of the total masterbatch of a fragrance (preferably perfume). The masterbatch is added during the normal manufacture of plastic pieces via additions in the extruder for injection molding, blow molding, sheet forming, blown film and other similar plastic processes. The plastics may also be foamed to maximize the amount of fragrance that may be added to the plastic piece and to further encourage its release into the atmosphere. The technology is detailed in WO 00/08095, U.S. Pat. No. 4,411,855, GB 2,180,157 and U.S. Pat. No. 3,797,742.

The fragranced masterbatch herein may be used during the manufacture of the lavatory bowl rim-block herein or parts thereof, such as the container, the dispensing means or attachment means (if any). This creates a rim-block that delivers a fragrance into the bathroom/toilet atmosphere upon use by releasing a fragrance directly from either the rim-block or parts thereof. Preferably, the fragranced masterbatch is used during the manufacture of the container herein. Indeed, this creates a convenient means to replenish the fragrance delivery component, as the fragrance delivery component is replaced at the same time with a fresh container once the liquid in the container is exhausted.

An alternative approach is to use the fragranced masterbatch for the manufacture of a separate plastic piece. This piece ("insert") may then be fastened to any part of the rim-block. The insert (or inserts) may be injection molded or manufactured by similar plastic processes. This method of using a separate insert as compared to using the fragranced masterbatch for the manufacture of the rim-block or parts thereof itself has the advantage of allowing more control of the amount of fragrance as well as control of the type of plastic used to maximize the amount of fragrance delivery. This is due to the fact that these plastic pieces only need to dispense fragrance. They do not need to have additional functions such as to fasten the rim-block to the lavatory bowl or contain/distribute a composition. In addition, the plastic pieces may be coloured and/or may be made from different designs to provide aesthetic improvements. Fastening of such inserts may be achieved by clipping the separate piece to parts of the rim-block, or by using adhesive or similar techniques. The pieces could be sold as refills either in a separate package or in a multi-pack combined with a container refill, if any. Both packs would have a high oxygen barrier package (as described herein above) to keep the fragrance in the pieces prior to usage.

In an alternative embodiment of the present invention, multiple pieces of fragranced plastic, preferably in the form of small beads or other similar designs, would be used. Using beads maximizes the surface area of the pieces and facilitates the release of fragrance. These beads are included in the rim-block in a recess in the surface of the rim-block or a part thereof, wherein preferably said recess is covered using a gas-permeable cover, preferably a perforated cover. This gas-permeable cover holds the beads in place prior to usage. The covering may consist of a rigid plastic grid that may be clipped into the recess over the beads to hold it in place or a perforated film that is heat sealed or glued over the recess. A further alternative is to create a cage like device that holds the beads and can be attached to the rim-block or parts thereof via various means. Alternatively, the cage may be integrally molded into parts of the rim-block. A further alternative is to contain the beads in an open top container. This container may take the same basic form as the container for the liquid, perfumed composition herein and be positioned either adjacent to or above the said container. This allows the beads-container to be easily refilled along with the container for the liquid, perfumed composition because both containers could be inserted into the dispensing means at the same time.

Permeable Films

In a preferred embodiment of the present invention, the fragrance delivery component herein may be a permeable film delivery system over a fragrance-releasing medium.

By "permeable film" it is meant herein a film-based material that has a high permeation rate to fragrance. Preferably said permeable film is a film-based material that has a high permeation rate to fragrance or a micro porous membrane material (preferable with a hydrophobic coating) that has sufficient voids within the film structure to allow the passage of perfume to the atmosphere. These films allows perfume vapor to escape the rim-block to the bathroom/toilet atmosphere while preventing the fragrance/perfume, if any, to escape or flush water to enter the device. They also allow control of the release rate of fragrance from the rim-block since the release rate can be controlled by film thickness and film/membrane material section. Suitable permeable films include highly permeable films such as low density polyethylene (LDPE), ethyl vinyl acetate (EVA), and the like, along with micro porous membranes such as those supplied by Gelman, Gore, Pall and other similar membrane suppliers. This technology is described in U.S. Pat. No. 4,898,328, WO 97/42983 and EP-A-0 596 212.

By "fragrance releasing medium", it is meant herein a medium that is capable of releasing a fragrance, preferably perfume, over a prolonged period of time. Suitable fragrance releasing mediums are selected from the group consisting of: fragranced gels as described herein above; fragranced plastics including beads as described herein above; and fragrance-containing liquid compositions preferably solvent based liquid compositions containing alcohols and other volatile ingredients; and pads impregnated with a fragrance-containing liquid composition; and combinations thereof.

The fragrance releasing medium herein with a covering permeable film may be placed directly into any appropriate position within the rim-block of the present invention, including combining the perfume releasing medium with a covering permeable film into the container and/or into the dispensing means and/or into the attachment means, if any. In a preferred embodiment herein, the fragrance-releasing medium is contained in a recess on the outer surface of the lavatory bowl rim-block herein and the recess is covered with a permeable film. Alternatively, the fragrance-releasing medium is contained in an open top container and covered with a permeable film. This container may take the same basic form as the container for the liquid, perfumed composition herein and be positioned either adjacent to or above the container. This allows the container for the fragrance-releasing medium sealed with a permeable film to be easily refilled along with the container for the liquid, perfumed composition because both containers could be placed in the rim-block at the same time. Alternatively, a small flat container for the perfume-releasing medium sealed with permeable film may be attached directly to the surface of the lavatory bowl rim-block herein or a part thereof, by a clipping mechanism, or an adhesive or similar method.

For all of the permeable film based embodiments, the product contained by the film may be protected from releasing its perfume into the atmosphere prior to purchase and usage of the rim-block. This can be achieved by packaging the rim-block in a package that has a high gas barrier as described herein above in the section titled "Fragranced gel".

In a preferred embodiment, a high barrier film would be laminated directly to the permeable film such that this film exists as a single structure. The bond between the barrier film and the permeable film would be very low such that when the film structure is sealed to the rim-block to encase the fragrance releasing medium, the bond between the permeable film and the rim-block is higher as compared to the bond between the permeable film and the barrier film and the bond between the permeable film and the barrier film is sufficiently low to allow easy peeling by the user. This system not only allows the user to easily remove the barrier film prior to using the rim-block, but also provides a much simpler manufacturing means to seal the permeable and barrier film in one simple step onto the liquid rim block.

Wicks

In a preferred embodiment of the present invention, the fragrance delivery component herein may be a wick delivery system comprising fragrance-containing liquid composition. More preferably, the fragrance delivery component herein is a wick delivery system comprising a perfumed liquid composition.

By "wick delivery system" it is meant herein a system wherein an absorbent substrate ("wick"), such a cotton or similar material, is part of a container wherein one end of the wick lies in a liquid composition containing a fragrance, preferably a perfume, while the other end of the wick lies either outside or at the very top of the opening of the container, and wherein the wick draws the fragrance-containing liquid into the wick via capillary forces and transports it to the end of the wick situated at the opening of the container. This causes the liquid composition containing a fragrance to evaporate and therefore the liquid continuously releases fragrance into the atmosphere of the bathroom/toilet. Wick technology is well know in the prior art and is described in U.S. Pat. Nos. 5,014,912, 6,514,467 and 5,000,383.

In a preferred embodiment herein, a wick delivery system being a container such as a bottle, having an opening and holding a volatile liquid containing a perfume wherein the container additionally contains a wick is part of the rim-block herein. This includes a container of a wick delivery system attached to the container and/or to the dispensing means and/or to the attachment means, if any. The bottle may be attached to the liquid rim block via clipping, adhesive tape etc.

The container of a wick delivery system itself can additionally be sold as a sealed unit with a cap as a refill.

Battery Powered/Electrical Fragrance Release Systems

In a preferred embodiment of the present invention, the fragrance delivery component herein may be a battery powered/electrical fragrance release system. In this embodiment the lavatory bowl rim-block herein contains a system that dispenses fragrance using an electrically or battery powered means to dispense a fragrance, preferably a perfume.

Any means suitable to dispense a fragrance using an electrically or battery powered means can be used herein. Preferably, said battery/electrical fragrance release system is an electrical or battery driven pumping means that distributes a fragrance over a prolonged period of time. In a highly preferred embodiment, said battery/electrical fragrance release system includes a cartridge for housing a liquid composition comprising a fragrance, a means for releasing the liquid composition from the cartridge and a means for forcing the liquid out of the cartridge using a gas-generating cell. The gas-generating cell herein preferably is an electrochemical cell (battery) that generates gas over a prolonged period of time. The means for forcing the liquid out of the cartridge is preferably a piston pump that presses the liquid composition comprising a perfume out of the cartridge. Suitable gas-generating cells as well as battery/electrical fragrance release system are described in U.S. Pat. Nos. 6,045,055, 6,109,539, WO 97/13007, WO 99/06614, WO 00/72951, U.S. Pat. Nos. 5,681,435, 5,899,381, WO 02/069935, WO 00/76645 and WO 02/16048.

In a preferred embodiment of the present invention, a battery/electrical fragrance release system is contained in the lavatory bowl rim-block herein. Indeed, the battery/electrical fragrance release system may be combined with the container and/or the dispensing means and/or into the attachment means, if any. The battery/electrical fragrance release system may be attached to the rim-block via clipping, adhesive tape, etc. Furthermore, the battery/electrical fragrance release system may be housed in a separate housing that is part of the rim-block herein.

The battery powered/electrical fragrance release system may be sold as a separate refill device to be combined with the rim-block. Alternatively, in a preferred embodiment, the battery/electrical fragrance release system is attached to or combined with the container of the rim-block herein and refills thereof are used whenever the liquid product in the container is exhausted. Refills may be sold either separately or in a multi pack with the liquid container refills to provide continuity of fragrance.

Liquid, Perfume-Containing Composition

The lavatory rim-block herein comprises a liquid, perfume-containing composition as a fourth essential element. The term "liquid composition" encompasses aqueous, thickened, gel and pasteous composition.

In a preferred embodiment herein, the liquid, perfume-containing composition herein is a thickened composition. The thickened composition herein may be in the form of a gel or a pasteous composition.

A preferred thickened composition of the present invention has a viscosity of 2 cps or greater, more preferably of from 2 to 5000 cps, and still more preferably of from 100 to 3500 cps at 20° C. when measured with a Carri-Med Rheometer model $CSL^2$ 100® (Supplied by TA Instruments) with a 4 cm conic spindle in stainless steal (linear increment from 0.1 to 100 $sec^{-1}$ in max. 8 minutes).

It is at these preferred viscosities that the thickened composition herein shows a good distribution of the composition over the lavatory bowl surface as well as an adherence to said surface sufficient to stick to the surface.

A preferred liquid composition herein comprises water in an amount of from 0.01% to 90%, even more preferably of from 2% to 70% and most preferably 5% to 60% by weight of the total composition.

In another preferred embodiment, the liquid, perfume-containing composition herein is substantially free of water, preferably free of water. By "substantially free of water" it is meant that no water as such is added to the liquid composition. However, the composition may comprise traces of water added to the composition through the raw materials used to produce the composition. The level of water added into the composition through the raw materials used to produce the liquid composition is preferably below 15%, more preferably below 5% by weight of the total composition.

The pH of the liquid, perfume-containing composition may typically be from 0 to 14. Preferably, the pH of the liquid compositions herein, as is measured at 25° C., is from 4 to 8, more preferably from 5 to 7.

Accordingly, the composition herein may further comprise an acid or base to adjust pH as appropriate. Acidity, if present, may further contribute to formulate compositions according to the present invention that exhibit good limescale removal performance whilst exhibiting also good disinfecting properties.

Accordingly, the composition of the present invention may comprise organic and/or inorganic acids. Particularly suitable organic acids to be used herein are aryl and/or alkyl sulfonate, such as methane sulphonic acids, citric acid, succinic acid, sulphamic acid, maleic acid and the like. Particularly suitable inorganic acids are sulfuric, phosphoric, nitric acids and the like.

A typical level of such an acid, when present, is of from 0.0001% to 15%, preferably from 0.001% to 10% and more preferably from 0.01% to 7% by weight of the total composition.

Suitable bases for use herein are the caustic alkalis, such as sodium hydroxide, potassium hydroxide and/or lithium hydroxide, and/or the alkali metal oxides such, as sodium and/or potassium oxide or mixtures thereof. Other suitable bases include ammonia, ammonium carbonate and hydrogen carbonate.

Typical levels of such bases, when present, are of from 0.001% to 5% by weight, preferably from 0.01% to 3% and more preferably from 0.1% to 2% by weight of the composition.

The lavatory rim-block herein may comprise additional composition(s) on top of the liquid, perfume-containing composition herein, wherein said compositions may have different properties, such as rheology profile, pH, water content etc. as compared to the liquid, perfume-containing composition. Preferably said additional composition(s) may be liquid, gel or solid composition(s), more preferably said additional composition(s) are liquid composition(s).

Depending on the end use envisioned, the compositions herein may further comprise a variety of other ingredients including dyes, optical brighteners, builders, pigments, solvents, buffering agents, radical scavengers, polymers, stabilizers and the like.

Fragrance

The liquid composition according to the present invention comprises a perfume. Furthermore, the fragrance delivery component preferably comprises a fragrance, more preferably a perfume and/or a deodorant, even more preferably a perfume.

The perfume of the liquid, perfumed composition and the fragrance of the fragrance delivery component are independent from each other.

In a preferred embodiment, the perfume, if any, of the fragrance delivery component herein and the perfume of the perfumed, liquid composition herein may be chemically identical compositions or at least having a similar odor. This provides continuity of perfume for the consumer.

In another preferred embodiment herein, the fragrance, preferably the perfume and/or deodorant, of the fragrance delivery component herein and the perfume of the perfumed, liquid composition herein are different from each other. This provides the potential for a "soft" perfume and/or a deodorant to be continuously released from the fragrance delivery component into the air to provide a pleasant smell and/or remove malodors, and a "harder" perfume to be used in the liquid composition to be released after the flush to mask malodors emanating from the toilet directly after usage. This system with two different fragrances also emphasizes to the consumer that the device is working after the flush.

Perfume

Any perfume suitable of delivering a perfume boost into the bathroom atmosphere upon flushing of the toilet may be used in the lavatory rim-block herein. Furthermore, any perfume suitable of being dispensed by the fragrance delivery component herein may be used herein.

Examples of the highly volatile, low boiling, perfumes are: anethole, benzaldehyde, benzyl acetate, benzyl alcohol, benzyl formate, iso-bornyl acetate, camphene, ciscitral (neral), citronellal, citronellol, citronellyl acetate, p-cymene, decanal, dihydrolinalool, dihydromyrcenol, dimethyl phenyl carbinol, eucaliptol, geranial, geraniol, geranyl acetate, geranyl nitrile, cis-3-hexenyl acetate, hydroxycitronellal, d-limonene, linalool, linalool oxide, linalyl acetate, linalyl propionate, methyl anthranilate, alpha-methyl ionone, methyl nonyl acetaldehyde, methyl phenyl carbinyl acetate, laevo-menthyl acetate, menthone, iso-menthone, mycrene, myrcenyl acetate, myrcenol, nerol, neryl acetate, nonyl acetate, phenyl ethyl alcohol, alpha-pinene, beta-pinene, gamma-terpinene, alpha-terpineol, beta-terpineol, terpinyl acetate, and vertenex (p-tertiary-butyl cyclohexyl acetate). Some natural oils also contain large percentages of highly volatile perfume ingredients. For example, lavandin contains as major components: linalool; linalyl acetate; geraniol; and citronellol. Lemon oil and orange terpenes both contain about 95% of d-limonene.

Examples of moderately volatile perfumes are: amyl cinnamic aldehyde, iso-amyl salicylate, beta-caryophyllene, cedrene, cinnamic alcohol, coumarin, dimethyl benzyl carbinyl acetate, ethyl vanillin, eugenol, iso-eugenol, flor acetate, heliotropine, 3-cis-hexenyl salicylate, hexyl salicylate, lilial (p-tertiarybutyl-alpha-methyl hydrocinnamic aldehyde), gamma-methyl ionone, nerolidol, patchouli alcohol, phenyl hexanol, beta-selinene, trichloromethyl phenyl carbinyl acetate, triethyl citrate, vanillin, and veratraldehyde. Cedarwood terpenes are composed mainly of alpha-cedrene, beta-cedrene, and other $C_{15}H_{24}$ sesquiterpenes.

Examples of the less volatile, high boiling, perfumes are: benzophenone, benzyl salicylate, ethylene brassylate, galaxolide (1,3,4,6,7,8-hexahydro-6,6,7,8,8-hexamethyl-cyclopenta-gama-2-benzopyran), hexyl cinnamic aldehyde, lyral (4-(4-hydroxy-4-methyl pentyl)-3-cyclohexene-10-carboxaldehyde), methyl cedrylone, methyl dihydro jasmonate, methyl-beta-naphthyl ketone, musk indanone, musk ketone, musk tibetene, and phenylethyl phenyl acetate.

Preferred perfumes are selected from the group consisting of: a cyclic terpene/sesquiterpene perfume, such as eucalyptol, cedrol, pinocarveolus, sesquiterpenic globulul alcohol; linalo; tetrahydrolinalo; verdox (cyclohexadiyl 2 tetryl butyl acetate); 6,3 hexanol; and citronellol and mixtures thereof.

The liquid, perfume-containing composition herein may comprise from 0.01% to 40%, preferably from 0.01% to 35%, more preferably from 0.1% to 30%, and most preferably from 0.1% to 25% by weight of the total composition of said perfume.

Deodorants

The liquid composition according to the present invention may additionally comprise a deodorant or deodorizing agent. Furthermore, the fragrance delivery component may comprise a deodorant or deodorizing agent (used herein a synonymous terms).

Any deodorant or deodorizing agent suitable of absorbing or at least reducing odors may be used for the present invention. Solid deodorants or deodorizing agents may be solubilised (e.g., dissolved in a suitable solvent, such as water) prior to incorporating into the liquid composition and/or the fragrance delivery component herein.

Suitable deodorants or deodorizing agents for use herein are selected from the group consisting of: cyclodextrins; metal salts of branched or straight chain, saturated ort unsaturated, one- or multiply hydroxylated fatty acids having at least 16 carbon atoms; metal salts of resinous acids; urease inhibitor complexes formed from a divalent metal ion and a polyanionic, preferably amine-based, chelating agent and mixtures thereof.

Suitable, deodorants or deodorizing agents are described, e.g., in EP 1,214,878 A1, U.S. Pat. Nos. 5,942,217, 5,939,060, 5,783,544, 5,714,137, 5,668,097 and U.S. Pat. No. 5,593,670.

In a preferred embodiment, the deodorant or deodorizing agent comprises a urease inhibitor complex formed from a divalent metal ion and a polyanionic, preferably amine-based, chelating agent, as specifically described in EP 1,214,878 A1 (sections [0008] to [0017]).

Processes

The present invention encompasses a process of treating a lavatory bowl surface with a lavatory bowl rim-block according to the present invention, wherein said process comprises the step of applying a liquid, perfume-containing composition onto a lavatory bowl surface.

Preferably, said application of said quid, perfume-containing composition onto a lavatory bowl surface is done upon flushing said lavatory bowl surface with water.

In said process of treating a lavatory bowl surface with a rim-block herein the liquid, perfume-containing composition is preferably applied onto said surface in diluted form, wherein dilution occurs upon application of the liquid composition herein to said surface By "in its diluted form" it is meant herein that said composition may be diluted with water up to a 120.000× dilution level, preferably between 50.000× to 80.000×, more preferably 10.000× to 60.000×, even more preferably 10.000× to 55.000×, and most preferably 20.000× to 50.000× dilution level.

Furthermore, the present invention encompasses the manufacture of a composition for use in one of the processes as described herein above.

What is claimed is:

1. A lavatory bowl rim-block comprising:
   a) at least about one container holding a liquid, perfume-containing composition;
   b) a dispensing means for dispensing said composition from under the rim of a lavatory bowl into the flush water of said lavatory bowl; and
   c) a fragrance delivery component;

wherein said fragrance delivery component does not dispense a fragrance using said dispensing means, said fragrance delivery component directly delivers the fragrance into the atmosphere independently of the delivery of the liquid, perfume-containing composition through said dispensing means, and said fragrance delivery component delivers said fragrance into the ambiance over a prolonged period of time, and further, wherein said fragrance delivery component is selected from the group consisting of: fragranced gels; fragranced plastics; a wick delivery system comprising fragrance-containing liquid; permeable film delivery systems combined with a fragranced gel or fragranced liquid; and battery powered/electrical fragrance release systems; and combinations thereof.

2. A lavatory bowl rim-block according to claim 1, wherein said lavatory bowl rim-block additionally comprises an attachment means, wherein said dispensing means comprises the attachment means and a supporting structure.

3. A lavatory bowl rim-block according to claim 2, wherein said attachment means attaches said lavatory bowl rim-block to the rim of a lavatory bowl or suspends said lavatory bowl rim-block from said rim, wherein said attachment means is a hook to suspend said lavatory bowl rim-block from the rim of a lavatory bowl.

4. A lavatory bowl rim-block according to claim 1, wherein said fragrance delivery component is a fragranced gel.

5. A lavatory bowl rim-block according to claim 4, wherein said fragranced gel is present in a recess on the outside portion of the lavatory bowl rim-block herein.

6. A lavatory bowl rim-block according to claim 4, wherein said fragranced gel is placed in a recess on the outward-facing section of said container.

7. A lavatory bowl rim-block according to claim 4, wherein said fragranced gel is placed in a recess on the rim-facing section of said container.

8. A lavatory bowl rim-block according to claim 1, wherein said fragrance delivery component is a fragranced plastic based on a plastic material selected from the group consisting of: polyethylene terephthalate (PET); polyethylene (PE); polypropylene (PP); polyvinyl chloride (PVC); high impact polystyrene (HIPS); and polystyrene (PS) and mixtures thereof.

9. A lavatory bowl rim-block according to claim 1, wherein said fragrance delivery component is a permeable film delivery system combined with a fragranced gel or fragrance-containing liquid medium.

10. A lavatory bowl rim-block according to claim 1, wherein said fragrance delivery component is a wick delivery system comprising a fragrance-containing liquid composition.

11. A lavatory bowl rim-block according to claim 1, wherein said fragrance delivery component is a battery powered/electrical fragrance release system.

12. A lavatory bowl rim-block according to claim 1, wherein said perfume present in said liquid, perfume-containing composition is selected from the group consisting of: a cyclic terpene/sesquiterpene perfume, such as eucalyptol, cedrol, pinocarveolus, sesquiterpenic globulul alcohol; linalo; tetrahydrolinalo; verdox (cyclohexadiyl 2 tetryl butyl acetate); 6,3 hexanol; and citronellol and mixtures thereof.

13. A lavatory bowl rim-block according to claim 1, wherein said fragrance dispensed by the fragrance delivery component is a perfume and/or a deodorant.

14. A lavatory bowl rim-block according to claim 13, wherein the perfume dispensed by the fragrance delivery component is selected from the group consisting of: a cyclic terpene/sesquiterpene perfume, such as eucalyptol, cedrol, pinocarveolus, sesquiterpenic globulul alcohol; linalo; tetrahydrolinalo; verdox (cyclohexadiyl 2 tetryl butyl acetate); 6,3 hexanol; and citronellol and mixtures thereof.

15. A lavatory bowl rim-block according to claim 13, wherein the deodorant dispensed by the fragrance delivery component is selected from the group consisting of: cyclodextrins; metal salts of branched or straight chain, saturated ort unsaturated, one- or multiply hydroxylated fatty acids having at least about 16 carbon atoms; metal salts of resinous acids; urease inhibitor complexes formed from a divalent metal ion and polyanionic chelating agents; and mixtures thereof.

16. A lavatory bowl rim-block according to claim 1, wherein said liquid, perfume-containing composition comprises from about 0.01% to about 40% by weight of the total composition of said perfume.

17. A lavatory bowl rim-block comprising:
 a) at least about one container holding a liquid, perfume-containing composition;
 b) a dispensing means for dispensing said composition from under the rim of a lavatory bowl into the flush water of said lavatory bowl; and
 c) a fragrance delivery component;
wherein said fragrance delivery component does not dispense a fragrance using said dispensing means, said fragrance delivery component directly delivers the fragrance into the atmosphere independently of the delivery of the liquid, perfume-containing composition through said dispensing means, and said fragrance delivery component delivers said fragrance into the ambiance over a prolonged period of time, and wherein said fragrance delivery component is a fragranced gel, and further, wherein said fragrance delivery component is selected from the group consisting of: fragranced gels; fragranced plastics; a wick delivery system comprising fragrance-containing liquid; permeable film delivery systems combined with a fragranced gel or fragranced liquid; and battery powered/electrical fragrance release systems; and combinations thereof.

18. A lavatory bowl rim-block according to claim 17, wherein said fragranced gel is present in a recess on the outside portion of the lavatory bowl rim-block herein.

19. A lavatory bowl rim-block according to claim 17, wherein said fragranced gel is placed in a recess on the outward-facing section of said container.

20. A lavatory bowl rim-block according to claim 17, wherein said fragranced gel is placed in a recess on the rim-facing section of said container.

21. A lavatory bowl rim-block according to claim 9, wherein said permeable film delivery system allows water to pass into the recess, but does not allow the water to escape the recess.

\* \* \* \* \*

UNITED STATES PATENT AND TRADEMARK OFFICE
CERTIFICATE OF CORRECTION

PATENT NO. : 7,788,740 B2  Page 1 of 1
APPLICATION NO. : 10/824126
DATED : September 7, 2010
INVENTOR(S) : Gian De Belder et al.

It is certified that error appears in the above-identified patent and that said Letters Patent is hereby corrected as shown below:

Column 15
Line 11, delete "-6,6,7,8,8-" and insert -- -4,6,6,7,8,8- --.

Signed and Sealed this
Fifteenth Day of March, 2011

David J. Kappos
*Director of the United States Patent and Trademark Office*